(12) United States Patent
Tang et al.

(10) Patent No.: US 10,289,897 B2
(45) Date of Patent: *May 14, 2019

(54) METHOD AND A SYSTEM FOR FACE VERIFICATION

(71) Applicant: Beijing SenseTime Technology Development Co., Ltd, Beijing (CN)

(72) Inventors: Xiaoou Tang, Shatin (CN); Yi Sun, Shatin (CN); Xiaogang Wang, Shatin (CN)

(73) Assignee: Beijing SenseTime Technology Development Co., Ltd, Beijing (CN)

( * ) Notice: Subject to any disclaimer, the term of this patent is extended or adjusted under 35 U.S.C. 154(b) by 11 days.

This patent is subject to a terminal disclaimer.

(21) Appl. No.: 15/366,944

(22) Filed: Dec. 1, 2016

(65) Prior Publication Data

US 2017/0083755 A1 Mar. 23, 2017

Related U.S. Application Data

(63) Continuation of application No. PCT/CN2014/000588, filed on Jun. 16, 2014.

(51) Int. Cl.
*G06K 9/00* (2006.01)
*G06K 9/46* (2006.01)
(Continued)

(52) U.S. Cl.
CPC ..... *G06K 9/00288* (2013.01); *G06K 9/00268* (2013.01); *G06K 9/00281* (2013.01);
(Continued)

(58) Field of Classification Search
CPC .............. G06K 9/00288; G06K 9/00268
See application file for complete search history.

(56) References Cited

U.S. PATENT DOCUMENTS

2015/0125049 A1* 5/2015 Taigman ............ G06K 9/00268
382/118

OTHER PUBLICATIONS

Krizhevsky et al: "ImageNet Classification with Deep Convolutional Neural Networks", NIPS proceedings, 2012.*
(Continued)

*Primary Examiner* — Ruiping Li
(74) *Attorney, Agent, or Firm* — Kilpatrick Townsend & Stockton LLP (57) ABSTRACT

Disclosed is an apparatus for face verification. The apparatus may comprise a feature extraction unit and a verification unit. In one embodiment, the feature extraction unit comprises a plurality of convolutional feature extraction systems trained with different face training set, wherein each of systems comprises: a plurality of cascaded convolutional, pooling, locally-connected, and fully-connected feature extraction units configured to extract facial features for face verification from face regions of face images; wherein an output unit of the unit cascade, which could be a fully-connected unit in one embodiment of the present application, is connected to at least one of previous convolutional, pooling, locally-connected, or fully-connected units, and is configured to extract facial features (referred to as deep identification-verification features or DeepID2) for face verification from the facial features in the connected units. The verification unit may be configured to compare the obtained DeepID2 extracted from two face images to be compared to determine if the two face images are from the same identity or not.

20 Claims, 6 Drawing Sheets

(51) Int. Cl.
*G06K 9/80* (2006.01)
*G06K 9/52* (2006.01)
*G06K 9/62* (2006.01)

(52) U.S. Cl.
CPC ............ *G06K 9/4628* (2013.01); *G06K 9/52* (2013.01); *G06K 9/6215* (2013.01); *G06K 9/6257* (2013.01); *G06K 9/80* (2013.01); *G06K 2009/4666* (2013.01)

(56) References Cited

OTHER PUBLICATIONS

U.S. Appl. No. 61/899,877, sepecification, of US Pub 2015/0125059, identified by Taigman.*
U.S. Appl. No. 61/899,877, drawings, of US Pub 2015/0125059, identified by Taigman.*
Huang et al: "Large Scale Strongly Supervised Ensemble Metric Learning, with Applications to Face Verification and Retrieval", 2012.*
Akinori Kawamura et al., "Feature-Extraction-Based Character Recognition Using Minimum Classification Error Training," Toshiba Multimedia Engineering Lab, Proceedings of the Japanese Electronic Information and Communication Society, D-II, vol. J81-D-II, No. 12, pp. 2749-2756, 1998, 9 pages.
Written Opinion of the International Searching Authority for PCT/CN2014/000588, dated Mar. 16, 2015, 5 pages.
Yi Sun et al., "Hybrid Deep Learning for Face Verification," IEEE International Conference on Computer Vision, 2013, 8 pages.

* cited by examiner

METHOD AND A SYSTEM FOR FACE VERIFICATION

The application is filed under 35 U.S.C. § 111(a) as a continuation of International Application No. PCT/CN2014/000588, filed Jun. 16, 2014, entitled "A Method and Systems for Face Verification," which is incorporated herein by reference in its entirety for all purposes.

TECHNICAL FIELD

The present application relates to a method for face verification and a system thereof.

BACKGROUND

Early subspace face recognition methods such as LDA and Bayesian face reduce the intra-personal variations due to poses, illuminations, expressions, ages, and occlusions while the inter-personal variations are enlarged. For example, LDA approximates inter- and intra-personal face variations by using two linear subspaces and finds the projection directions to maximize the ratio between them.

More recent studies have also targeted the same goal, either explicitly or implicitly. For example, metric learning is proposed to map face images to some feature representation such that face images of the same identity are close to each other while those of different identities stay apart. However, these models are much limited by their linear nature or shallow structures, while inter- and intra-personal variations are complex, highly nonlinear, and observed in high-dimensional image space.

In recent years, a great deal of efforts has been made to learn effective features for face recognition with deep models using either the identification or verification supervisory signals. The learned features with identification signal have achieved accuracies of around 97.45% on LFW.

The idea of jointly solving the classification and verification tasks was applied to general object recognition, with the focus on improving classification accuracy on fixed object classes instead of hidden feature representations.

SUMMARY

In one aspect of the present application, disclosed is an apparatus for face verification. The apparatus may comprise a feature extraction unit and a verification unit. In one embodiment, the feature extraction unit comprises a plurality of convolutional feature extraction systems trained with different face training set, wherein each of systems comprises: a plurality of cascaded convolutional, pooling, locally-connected, and fully-connected feature extraction units configured to extract facial features for face verification from face regions of face images; wherein an output unit of the unit cascade, which could be a fully-connected unit in one embodiment of the present application, is connected to at least one of previous convolutional, pooling, locally-connected, or fully-connected units, and is configured to extract facial features (referred to as deep identification-verification features or DeepID2) for face verification from the facial features in the connected units.

The verification unit may be configured to compare the obtained DeepID2 extracted from two face images to be compared to determine if the two face images are from the same identity or not.

In another aspect of the present application, disclosed is a method for face verification. The method may comprise a step of extracting DeepID2 from different regions of face images by using differently trained convolutional feature extraction systems, wherein output layer neuron activations of said convolutional feature extraction systems are considered as DeepID2; and a step of comparing DeepID2 extracted from two face images to be compared, respectively, to determine if the two face images are from the same identity or not.

According to the present application, the apparatus may further comprise a training unit configured to train a plurality of convolutional feature extraction systems for simultaneous identity classification and verification by inputting pairs of aligned face regions and adding identification and verification supervisory signals to the convolutional feature extraction systems simultaneously.

According to the present application, there is further a method for training a convolutional feature extraction system, comprising:

1) sampling two face region-label pairs from a predetermined training set;
2) extracting DeepID2 from the two face regions in the two sampled face region-label pairs, respectively;
3) classifying DeepID2 extracted from each face region into one out of all classes of face identities;
4) comparing the classified identity and a given ground-truth identity to generate identification errors;
5) comparing dissimilarities between two DeepID2 vectors extracted from two face regions to be compared, respectively, to generate verification errors;
6) back-propagating a combination of the generated verification errors and the generated identification errors through the convolutional feature extraction system so as to adjust weights on connections between neurons of the convolutional feature extraction system; and
7) repeating steps 1)-6) until the training process is converged such that the weights on connections between neurons of the convolutional feature extraction system are determined.

According to the present application, there is further a system for training a convolutional feature extraction system, comprising:

means for sampling two face region-label pairs from a predetermined training set; means for extracting DeepID2 from the two face regions in the two sampled face region-label pairs, respectively;

means for classifying DeepID2 extracted from each face region into one out of all classes of face identities;

means for comparing the classified identity and a given ground-truth identity to generate identification errors;

means for comparing dissimilarities between two DeepID2 vectors extracted from two face regions to be compared, respectively, to generate verification errors;

means for back-propagating a combination of the generated verification errors and identification errors through the convolutional feature extraction system so as to adjust weights on connections between neurons of the convolutional feature extraction system; and means for repeating the above steps until the training process is converged such that the weights on connections between neurons of the convolutional feature extraction system are determined.

According to the present application, there is further provided a computer-readable medium for storing the instructions executable by one or more processors to:

1) sampling two face region-label pairs from a predetermined training set;

2) extracting DeepID2 from the two face regions in the two sampled face region-label pairs, respectively;

3) classifying DeepID2 extracted from each face region into one out of all classes of face identities;

4) comparing the classified identity and a given ground-truth identity to generate identification errors;

5) comparing dissimilarities between two DeepID2 vectors extracted from two face regions to be compared, respectively, to generate verification errors;

6) back-propagating a combination of the generated verification errors and identification errors through the convolutional feature extraction system so as to adjust weights on connections between neurons of the convolutional feature extraction system; and 7) repeating steps 1)-6) until the training process is converged such that the weights on connections between neurons of the convolutional feature extraction system are determined.

In contrast to existing methods, the present application deals with inter- and intra-personal face variations with deep convolutional feature extraction systems, which can learn effective DeepID2 for face recognition through hierarchical nonlinear mappings due to their deep architectures and large learning capacities.

The present application learns DeepID2 by using two supervisory signals simultaneously, i.e. the face identification and the face verification signals. The face identification signal increases the inter-personal variations by drawing DeepID2 extracted from different identities apart, while the face verification signal reduces the intra-personal variations by pulling DeepID2 extracted from the same identity together, both of which are essential to face recognition.

The present application characterizes faces in different aspects by extracting complementary DeepID2 from various face regions and resolutions, which are then concatenated to form the final feature representation after PCA dimension reduction. The learned DeepID2 are superior to features learned by existing methods in that they are diverse among different identities while consistent within the same identity, which makes the following face recognition easier.

BRIEF DESCRIPTION OF THE DRAWING

Exemplary non-limiting embodiments of the present invention are described below with reference to the attached drawings. The drawings are illustrative and generally not to an exact scale. The same or similar elements on different figures are referenced with the same reference numbers.

DETAILED DESCRIPTION

Figure 1:
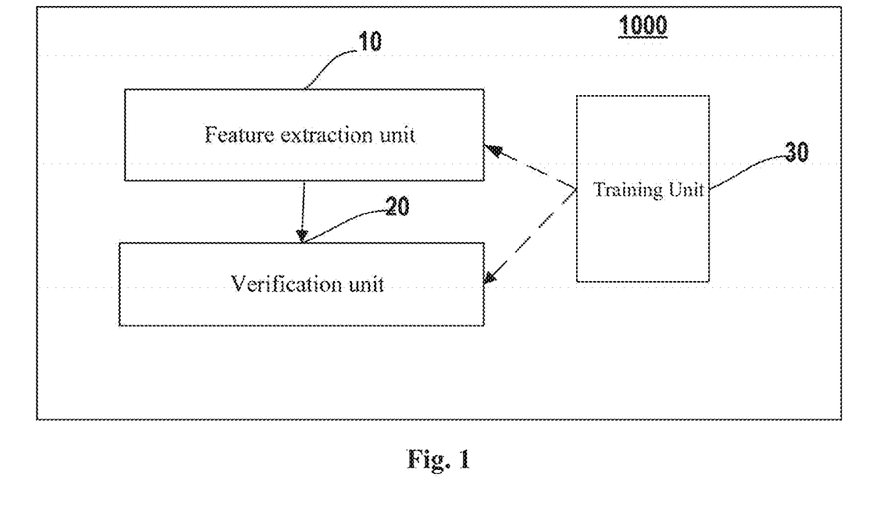
FIG. 1 is a schematic diagram illustrating an apparatus for face verification consistent with some disclosed embodiments.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary apparatus 1000 for face verification consistent with some disclosed embodiments.

It shall be appreciated that the apparatus 1000 may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

Figure 2:
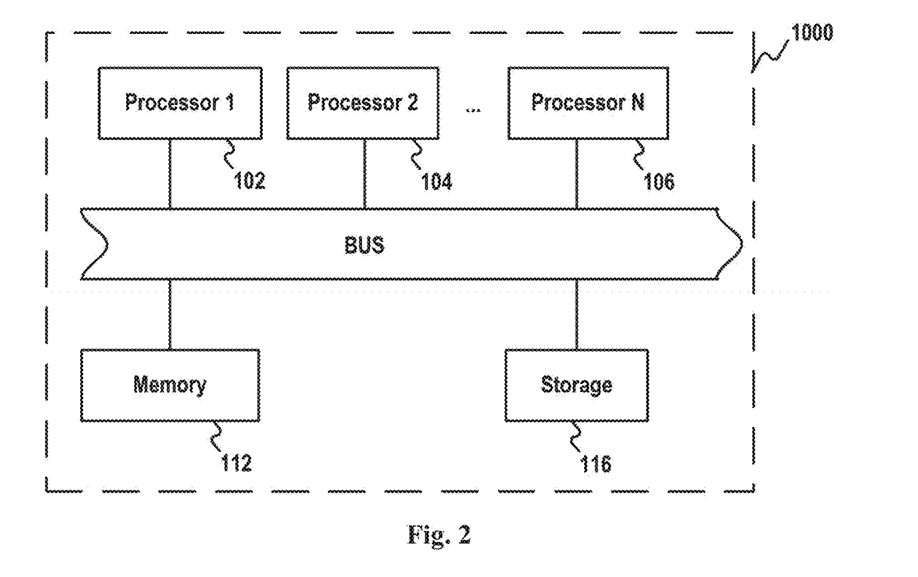
FIG. 2 is a schematic diagram illustrating an apparatus for face verification when it is implemented in software, consistent with some disclosed embodiments.

In the case that the apparatus 1000 is implemented with software, the apparatus 1000 may include a general purpose computer, a computer cluster, a mainstream computer, a computing device dedicated for providing online contents, or a computer network comprising a group of computers operating in a centralized or distributed fashion. As shown in FIG. 2, apparatus 1000 may include one or more processors (processors 102, 104, 106 etc.), a memory 112, a storage device 116, a communication interface 114, and a bus to facilitate information exchange among various components of apparatus 1000. Processors 102-106 may include a central processing unit ("CPU"), a graphic processing unit ("GPU"), or other suitable information processing devices. Depending on the type of hardware being used, processors 102-106 can include one or more printed circuit boards, and/or one or more microprocessor chips. Processors 102-106 can execute sequences of computer program instructions to perform various methods that will be explained in greater detail below.

Memory 112 can include, among other things, a random access memory ("RAM") and a read-only memory ("ROM"). Computer program instructions can be stored, accessed, and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 112 may include multiple physical devices installed on a central computing device or on different computing devices.

Referring FIG. 1 again, where the apparatus 1000 is implemented by the hardware, it may comprise a feature extraction unit 10 and a verification unit 20. The feature extraction unit 10 is configured to extract DeepID2 (deep identification-verification features) from different regions of face images by using differently trained convolutional feature extraction systems, and takes output layer neuron activations of said convolutional feature extraction systems as DeepID2. The verification unit 20 is configured to compare DeepID2 extracted from two face images to be compared, respectively, to determine if the two face images are from the same identity or not.

The Feature Extraction Unit (Extractor) 10

Figure 3:
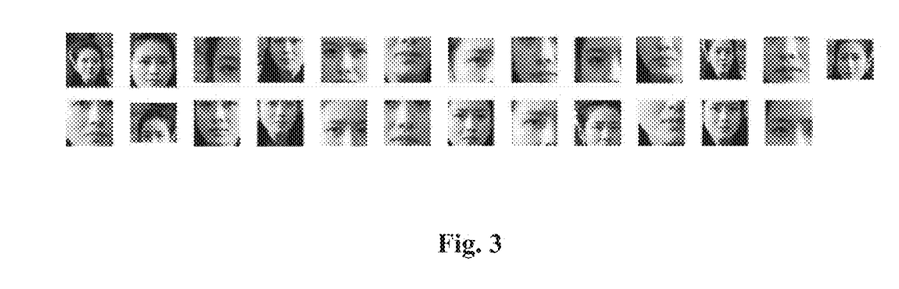
FIG. 3 is a schematic diagram illustrating a group of selected face regions from which to extract DeepID2, consistent with a first disclosed embodiment.
Figure 4:
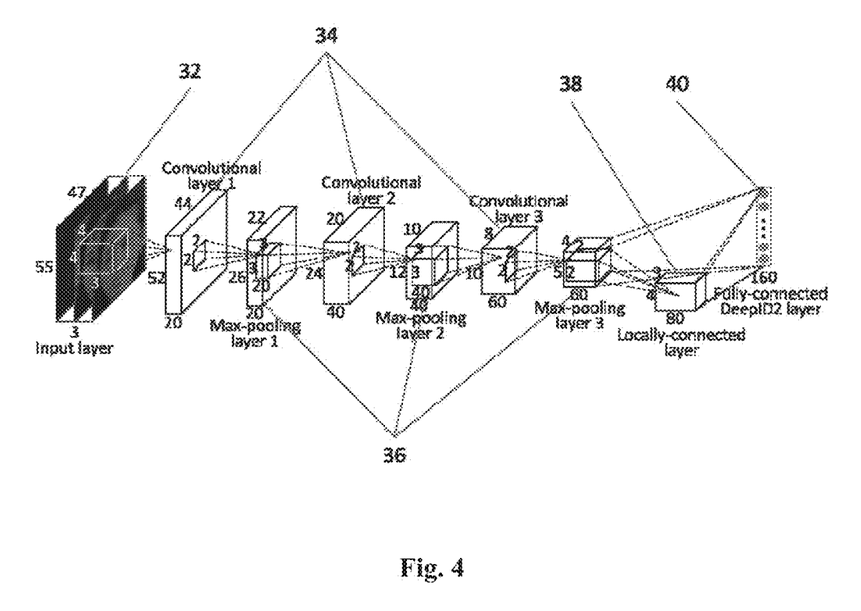
FIG. 4 is a schematic diagram illustrating the detailed structure of a convolutional feature extraction system, consistent with a second disclosed embodiment.

The feature extraction unit 10 contains a plurality of convolutional feature extraction systems and operates to input a particular face region to each of the convolutional feature extraction systems to extract DeepID2. FIG. 3 illustrates examples of selected input face regions to extract DeepID2 after face alignment, wherein face regions contain large variations in positions, scales, color channels, and horizontal flipping. FIG. 4 illustrates an example of the convolutional feature extraction system, which comprises an input layer (herein, also referred to as an input unit) 32, a plurality of convolutional layers (herein, also referred to convolutional units) 34, a plurality of pooling layers (herein, also referred to pooling units) 36, a plurality of locally-connected layers (herein, also referred to locally-connected units) 38, and a plurality of fully-connected layers (herein, also referred to as fully-connected units) 40, wherein the output layer of the convolutional feature extraction system, which could be a fully-connected layer 40 in one embodiment of the present application, is connected to one or more previous convolutional, pooling, locally-connected, or fully-connected layers. Each of the convolutional, pooling, locally-connected, and fully-connected layers contains a plurality of neurons with local or global receptive fields, and shared or unshared connection weights between the neurons. The output layer (which could be a fully-connected layer 40) neuron activations of the convolutional feature extraction system are the extracted DeepID2 which will be further discussed later.

In embodiments of the present application as shown in FIG. 4, each of the convolutional feature extraction system contains n (for example, n=3) convolutional layers 34, each of which is followed by a max-pooling layer 36. The third max-pooling layer is followed by a locally-connected layer 38 and a fully-connected layer 40. The fully-connected layer 40 is the DeepID2 layer, which is fully-connected to both the locally-connected layer 38 and the third max-pooling layer 36. Weight-sharing is not required on the entire feature map in higher convolutional layers. Specifically, in the third convolutional layer of the shown deep convolutional feature extraction system, neuron weights are locally shared in every 2×2 (for example) local regions. The convolutional feature extraction system extracts a multi-dimensional (for example, 160-dimensional) DeepID2 vector at its last layer (the DeepID2 layer 40) of the feature extraction cascade. Rectified linear units (ReLU) are used for neurons in the convolutional layers 34, locally-connected layer 38, and the fully-connected DeepID2 layer 40. In the embodiment as shown in FIG. 4, RGB input of sizes 55×47 (for example) is used. When the size of the input region changes, the map sizes in the following layers will change accordingly.

Hereinafter, the convolution, pooling, local-connection, and full-connection operations in convolutional feature extraction systems as mentioned in the above will be further discussed.

The convolutional layers 34 are configured to extract local facial features from input feature maps (which is output feature maps of the previous layer) to form output feature maps of the current layer. Each feature map is a certain kind of features organized in 2D. The features in the same output feature map or in local regions of the same feature map are extracted from input feature maps with the same set of neruon connection weights. The convolution operation in each convolutional layer 34 of the convolutional feature extraction system as shown in FIG. 4 may be expressed as $$y^{j(r)} = \max\left(0, b^{j(r)} + \sum_i k^{ij(r)} * x^{i(r)}\right) \quad (1)$$

where $x^i$ and $y^j$ are the i-th input feature map and the j-th output feature map, respectively. $k^{ij}$ is the convolution kernel between the i-th input feature map and the j-th output feature map. * denotes convolution. $b^j$ is the bias of the j-th output feature map. Herein, ReLU nonlinearity $y=\max(0, x)$ is used for neurons, which is shown to have better fitting abilities than the sigmoid function on large training data. Weights in higher convolutional layers of the ConvNets are locally shared to learn different mid- or high-level features in different regions. r indicates a local region where weights are shared.

The pooling layers 36 are configured to extract more global and invariant facial features. Max-pooling is used in the pooling layers 36 of FIG. 4, which is formulated as $$y_{j,k}^i = \max_{0 \le m,n < s}\{x_{j \cdot s+m, k \cdot s+n}^i\} \quad (2)$$

where each neuron in the i-th output feature map $y^i$ pools over an s×s non-overlapping local region in the i-th input feature map $x^i$.

The locally-connected layer 38 is configured to extract local facial features from input feature maps (which is output feature maps of the previous layer) to form output feature maps of the current layer. The features in the output feature maps are extracted from input feature maps with different set of neuron connection weights. In embodiments of the present application, the locally-connected layer 38 follows the third pooling layer 36. The operation of the locally-connected layer 38 may be expressed as $$y_{k,l}^j = \max\left(0, \sum_i \sum_{m=0}^{s-1} \sum_{n=0}^{s-1} x_{k+m,l+n}^i \cdot w_{k,l}^{i,j} + b_{k,l}^j\right) \quad (3)$$

where each neuron in the j-th output feature map is locally-connected to neurons in the same s×s local regions in all previous feature maps, followed by ReLU activation functions.

The fully-connected layer 40 (which is used as the output layer or DeepID2 layer in embodiments of the present application) may be fully-connected to at least one of the previous convolutional layers 34, pooling layers 36, locally-connected layers 38, or fully-connected layers 40. In the embodiment as shown in FIG. 4, the fully-connected layer 40 of DeepID2 is fully-connected to both the third pooling layer 36 and the locally-connected layer 38 such that it sees multi-scale features (features in the locally-connected layer 38 are more global than those in the third pooling layer 36). This is critical to feature learning because after successive down-sampling along the cascade, the locally-connected layer 38 contains too few neurons and becomes the bottleneck for information propagation. Adding the by-passing-connections between the third pooling layer 36 (referred to as the skipping layer) and the DeepID2 layer 40 reduces the possible information loss in the locally-connected layer 38. The output DeepID2 layer 40 may get DeepID2 vector y by rule of $$y_j = \max\left(0, \sum_i x_i^1 \cdot w_{i,j}^1 + \sum_i x_i^2 \cdot w_{i,j}^2 + b_j\right) \quad (4)$$

where $x^1$, $x^2$ denote neuron outputs (features) in the third pooling layer 36 and the locally-connected layer 38, respectively; $w^1$ and $w^2$ denote corresponding connection weights. Neurons in DeepID2 layer 40 linearly combines features in the previous two layers (the third pooling layer 36 and the locally-connected layer 38), followed by ReLU non-linearity. $y_j$ is the j-th element of a multi-dimensional real-valued vector y, i.e. j-th element of DeepID2 vector.

In embodiments of the present application, EGM algorithm is first used to detect a plurality of facial landmarks. Herein, the present application is discussed by taking 21 facial landmarks as an example. Each of the face images are globally aligned by similarity transformation according to the detected landmarks. Then a plurality of (for example, 400) face regions are cropped, which vary in positions, scales, color channels, and horizontal flipping, according to the globally aligned face images and the position of the facial landmarks. As an example, if there are 400 cropped face regions, 400 DeepID2 vectors will be extracted by a total of 200 deep convolutional feature extraction systems, each of which is trained to extract two 160-dimensional DeepID2 vectors on one particular face region and its horizontally flipped counterpart, respectively, of each face image. To reduce the redundancy among the large number of DeepID2, the forward-backward greedy algorithm is used to select a small number of effective and complementary DeepID2 vectors (25 in the embodiment as shown in FIG. 3), from which 25 160-dimensional DeepID2 vectors are extracted and are concatenated to a 4000-dimensional DeepID2 vector. The 4000-dimensional vector is further compressed by PCA for further face verification.

The Verification Unit (Verifier) 20

According to one embodiment of the present application, each of the extracted DeepID2 may form a feature vector. The formed vector may have, for example, 160 dimensions as shown in FIG. 4. The verification unit 20 may select a plurality of face regions of each face image to extract DeepID2. For example, in the embodiment as shown in FIG. 3, 25 face regions are selected, but other quantities of the face regions are applicable. A longer DeepID2 vector is formed by concatenating the extracted DeepID2 from the selected face regions of each face image. For example, in the embodiment as shown in FIG. 3 and FIG. 4 in which 25 face regions are selected, the concatenated vector may be of 160×25=4000 dimensions. Two concatenated DeepID2 vectors extracted from the selected face regions of two face images to be compared, respectively, is compared by a face verification algorithm to get a face verification score. The face verification algorithm may be implemented using SVM, LDA, Joint Bayesian, or other face verification models. The concatenated DeepID2 vectors may go through a dimensionality reduction algorithm (PCA, for example) before comparing by the face verification algorithm. A plurality of face verification scores may be obtained by operating the face verification algorithm on different DeepID2 vectors extracted from different groups of selected face regions. The plurality of face verification scores are fused by a fusing algorithm to get a final face verification decision.

In embodiments of the present application, face verification may be conducted by, for example, Joint Bayesian model, which compares two (concatenated) DeepID2 vectors extracted from two face images to be compared, respectively, and output a face verification score. Joint Bayesian models assume feature representation of a face image as the sum of inter- and intra-personal variations, both of which are modeled as Gaussian distributions and can be estimated from training data. Face verification is testing the log-likelihood-ratio between the joint probabilities of two face images given the inter- or intra-personal variation hypothesis, respectively.

In embodiments of the present application, to further exploit the rich pool of DeepID2 extracted from the large number of face regions, the feature selection algorithm is repeated for a plurality of (seven, for example) times, each time choosing DeepID2 from face regions that have not been selected by previous feature selection steps. Then the Joint Bayesian model is learned on each of one or more (for example, seven) groups of selected DeepID2, respectively. The Joint Bayesian scores of each pair of compared face images are fused (for example, by an SVM) to get the final face verification decision.

The Training Unit (Trainer) 30

Figure 5:
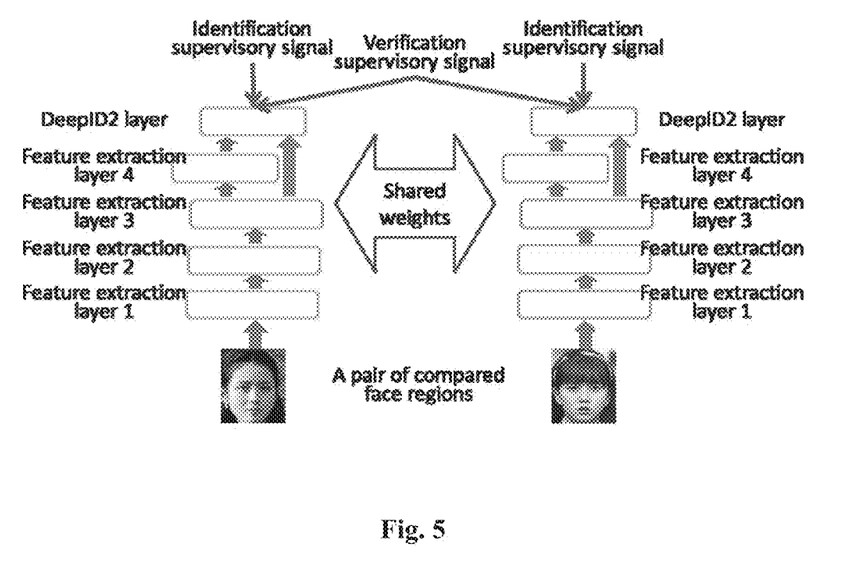
FIG. 5 is a schematic diagram illustrating the identification and the verification supervisory signals, which are added to DeepID2 in output layers of the convolutional feature extraction systems.
Figure 8:
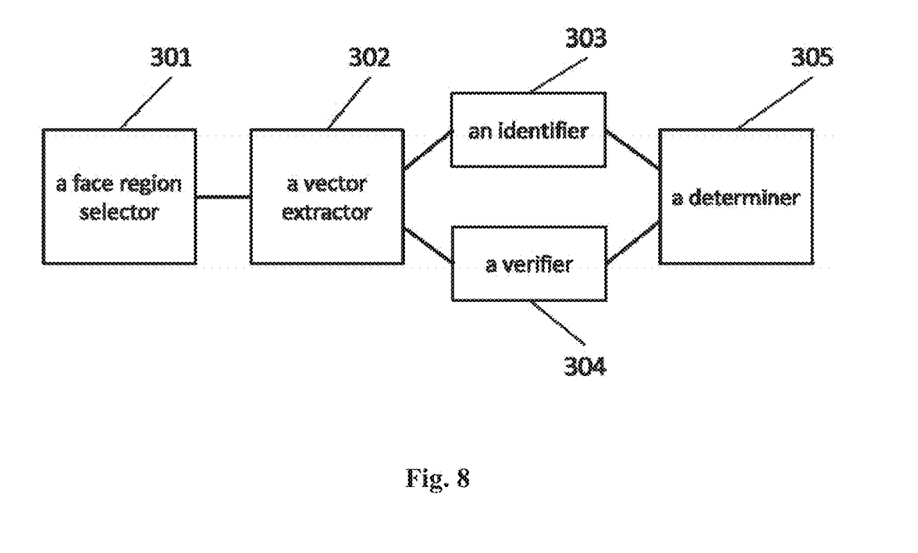
FIG. 8 is a schematic diagram illustrating the training unit as shown in FIG. 1 consistent with some disclosed embodiments.

The apparatus 1000 further comprises a training unit 30 configured to train a plurality of convolutional feature extraction systems for simultaneous identity classification and verification by inputting pairs of aligned face regions and adding identification and verification supervisory signals to the output layer 40 (DeepID2 layer as shown in FIG. 5) of the convolutional feature extraction systems simultaneously. In one embodiment of the present application as shown in FIG. 8, the training unit 30 may comprise a face region selector

Figure 7:
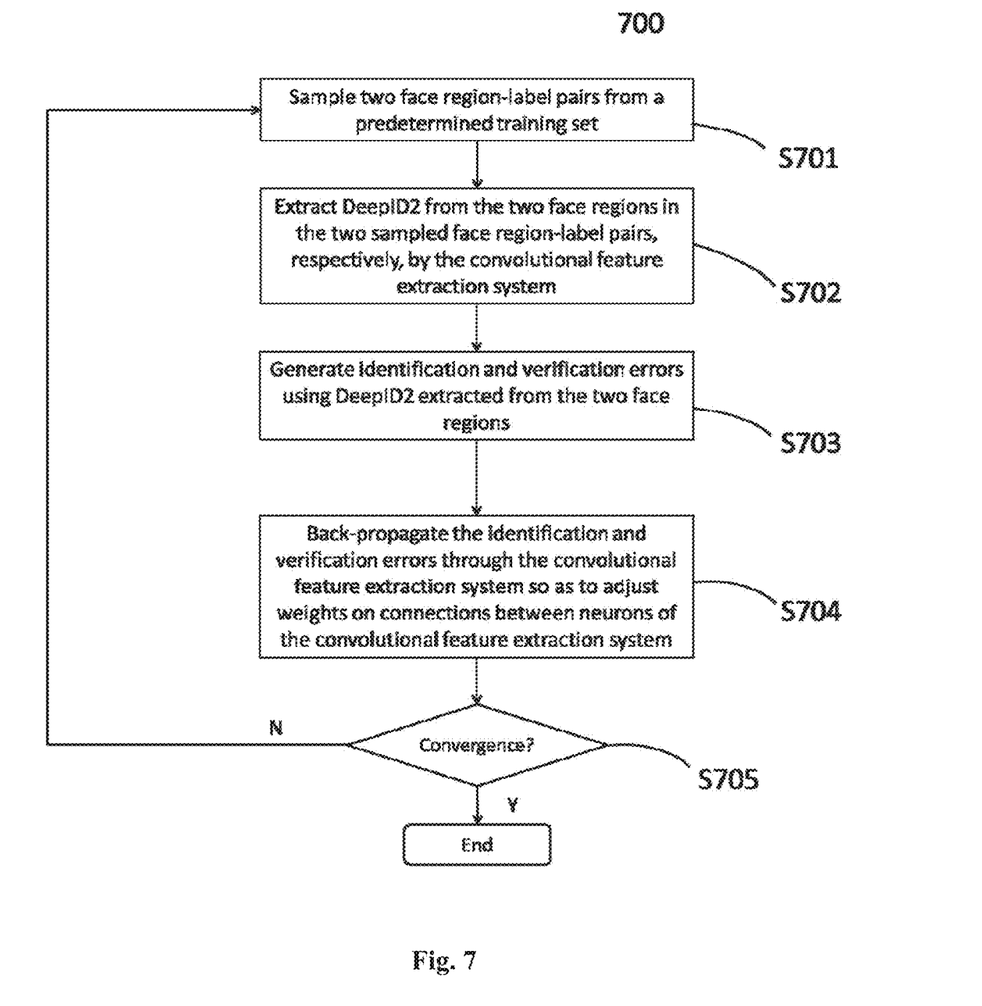
FIG. 7 is a schematic flowchart illustrating training process of deep convolutional feature extraction systems to extract DeepID2 consistent with some disclosed embodiments.

301, a vector extractor 302, an identifier 303, a verifier 304 and a determiner 305. For each of the convolutional feature extraction systems, FIG. 7 illustrates a schematic flowchart for training process consistent with some disclosed embodiments, from which the components 301-305 of the training unit 30 is further discussed as below.

As shown, in step S701, two face region-label pairs, which are the pairs of the aligned face regions and their corresponding face identity labels, are selected by the sample selector 301 from a predetermined training set. In one embodiment, the two face region-label pairs may be selected randomly with an equal probability of belonging to the same or different identities. In step S702, the vector extractor 302 uses the convolutional feature extraction system with initialized or previously learned weights on connections between neurons to extract two DeepID2 vectors from the two face regions selected by selector 301 in the two sampled face region-label pairs, respectively, each of which is multi-dimensional (for example, 160-dimensional) in the embodiment as shown in FIG. 4.

And then in step S703, the identifier 303 operates to classify each of the two face regions in the two face region-label pairs into one out of n identities by a softmax layer (not shown) following the DeepID2 layer. Then the identifier 303 generates identification errors (identification supervisory signals) by comparing the differences between the classified identity and a given ground-truth identity. The generated identification errors are back-propagated through the convolutional feature extraction system so as to adjust weights on connections between neurons of the convolutional feature extraction system.

In one embodiment of the present application, the softmax layer is used to classify each face region into one of n (e.g., n=8192) different face identities by outputting a probability distribution over the n classes of face identities. Softmax layer is defined as:

$$\hat{p}_i = \frac{\exp(y_i)}{\sum_{j=1}^{n} \exp(y_j)}, \quad (5)$$

where $\hat{p}_i$ is the predicted probability of being the i-th identity, $$y_j = \sum_{i=1}^{160} x_i \cdot w_{i,j} + b_j$$

linearly combines the 160-dimensional DeepID2 $x_i$ as the input of neuron j, and $y_j$ is its output. The convolutional feature extraction system is trained to minimize the cross-entropy loss, which is referred to as the identification loss, in the softmax layer. It is denoted as:

$$Ident(f, t, \theta_{id}) = -\sum_{i=1}^{n} -p_i \log \hat{p}_i = -\log \hat{p}_t \quad (6)$$

where f is the DeepID2 vector, t is the target class, and $\theta_{id}$ denotes weights on connections between neurons of the n-way softmax layer. $p_i$ is the target probability distribution, where $p_i=0$ for all i except $p_t=1$ for the target class t. $\hat{p}_i$ is the predicted probability distribution by the n-way softmax layer.

The verifier 304 operates to generate verification errors (verification supervisory signals) by comparing the dissimilarity between the two DeepID2 vectors $f_i$ and $f_j$ extracted from two face regions to be compared, respectively, as shown in Eq. 5. In one embodiment, the verification errors may be generated by minimizing dissimilarities between DeepID2 extracted from face regions of the same identity while maximizing or keeping larger than a threshold dissimilarities between DeepID2 extracted from face regions of different identities. The dissimilarities between DeepID2 could be but not limited to negative of L1 norm, L2 norm, and cosine similarity between DeepID2. The face verification signal may be used to encourage DeepID2 extracted from face images of the same identity to be similar. Commonly used constraints for the verification signal include the L1/L2 norm and cosine similarity. The L2 norm constraints could be formulated as:

$$Verif(f_i, f_j, y_{ij}, \theta_{ve}) = \begin{cases} \frac{1}{2}\|f_i - f_j\|_2^2 & \text{if } y_{ij} = 1 \\ \frac{1}{2}\max(0, m - \|f_i - f_j\|_2)^2 & \text{if } y_{ij} = -1 \end{cases}, \quad (7)$$

where $f_i$ and $f_j$ are DeepID2 extracted from the two face regions in comparison. $y_{ij}=1$ means that $f_i$ and $f_j$ are from the same identity. In this case, it minimizes the L2 distance between the two DeepID2 vectors. $y_{ij}=-1$ means different identities, and the L2 norm constraint requires the distance lager than a margin m. Loss functions based on the L1 norm could have similar formulations.

The cosine similarity constraint could be formulated as:

$$Verif(f_i, f_j, y_{ij}, \theta_{ve}) = \frac{1}{2}(y_{ij} - \sigma(wd+b))^2 \quad (8),$$

where $$d = \frac{f_i \cdot f_j}{\|f_i\|_2 \|f_j\|_2}$$

is the cosine similarity between the DeepID2, w and b are learnable scaling and shifting parameters, σ is the sigmoid function, and $y_{ij}$ is the binary target of whether the two compared face regions belong to the same identity.

The generated verification errors may be back-propagated through the convolutional feature extraction system so as to adjust weights on connections between neurons of the convolutional feature extraction system. Alternatively, in one embodiment of the present application, the combination of identification and verification errors may be back-propagated through the convolutional feature extraction system so as to adjust weights on connections between neurons of the convolutional feature extraction system.

In step S704, the identification and verification errors are back-propagated through all layers of the convolutional feature extraction system so as to adjust weights on connections between neurons of the convolutional feature extraction system. In step S705, it is determined by the determiner 305 if the training process is converged, if yes, the process is terminated; otherwise it will repeat step S701-S704 until the training process is converged such that the weights on connections between neurons of the convolutional feature extraction system are determined.

Figure 6:
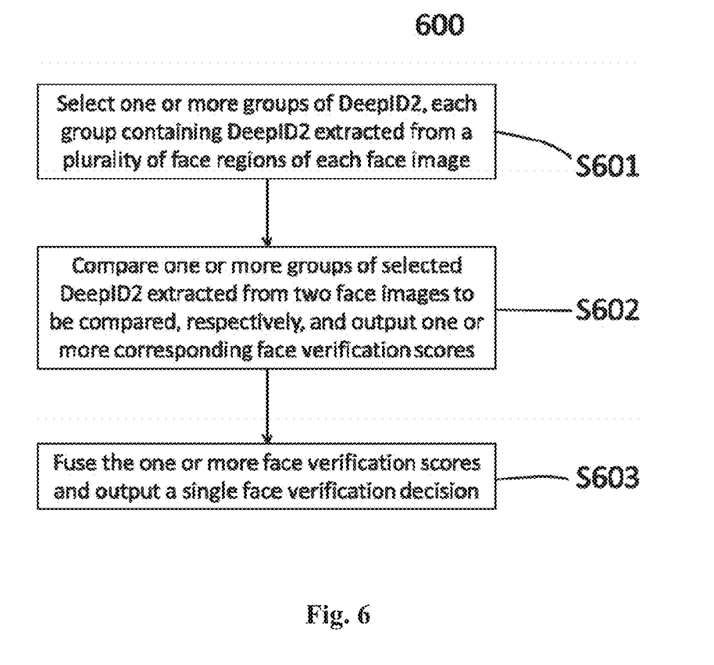
FIG. 6 is a schematic flowchart illustrating face verification consistent with some disclosed embodiments.

FIG. 6 shows a flowchart illustrating a method for face verification consistent with some disclosed embodiments. In FIG. 6, process 200 comprises a series of steps that may be performed by one or more of processors 102-106 or each module/unit of the apparatus 1000 to implement a data processing operation. For purpose of description, the following discussion is made in reference to the situation where each module/unit of the apparatus 1000 is made in hardware or the combination of hardware and software. The skilled in the art shall appreciate that other suitable devices or systems shall be applicable to carry out the following process and the apparatus 1000 are just used to be an illustration to carry out the process.

At step S101, the apparatus 1000 operates to extracts DeepID2 from different regions of face images by using differently trained convolutional feature extraction systems, wherein output layer neuron activations of said convolutional feature extraction systems are considered as DeepID2. In one embodiment, the unit 10 of the apparatus 1000 may, for example, detects 21 facial landmarks (other number of landmarks may be applicable), such as the two eye centers, the nose tip, and the two mouth corners, with the facial point detection method proposed by the prior art. In embodiments of the present application, EGM algorithm is first used to detect the 21 facial landmarks (other number of landmarks may be applicable). Each of the face images are globally aligned by similarity transformation according to the detected landmarks. Then a plurality of face regions are cropped, which vary in positions, scales, color channels, and horizontal flipping, according to the globally aligned face images and the position of the facial landmarks. Accordingly, a plurality of DeepID2 vectors are extracted by differently trained deep convolutional feature extraction systems, each of which extracts one multi-dimensional DeepID2 vector on one particular face region of each face image.

And then in step s102, the apparatus 1000 (in particular, the unit 10) operates to concatenate the DeepID2 vectors.

The concatenated long DeepID2 vector is further compressed by PCA for face verification.

And then in step S103, face verification is conducted by Joint Bayesian model, which compares DeepID2 extracted from two face images to be compared, respectively, and output a face verification score by the unit 30. Joint Bayesian models take feature representation of a face image as the sum of inter- and intra-personal variations, both of which are modeled as Gaussian distributions and can be estimated from training data. Face verification is testing the log-likelihood-ratio between the joint probabilities of two face images given the inter- or intra-personal variation hypothesis, respectively, which has closed-form solutions and is efficient.

In embodiments of the present application, to further exploit the rich pool of DeepID2 extracted from the large number of face regions, the feature selection algorithm is repeated for a plurality of (for example, seven) times, each time choosing DeepID2 from face regions that have not been selected by previous feature selection steps. Then the Joint Bayesian model is learned on each of the seven groups of selected DeepID2, respectively. The seven Joint Bayesian scores on each pair of compared face images are fused (for example, by an SVM) to get the final face verification decision.

Although the preferred examples of the present invention have been described, those skilled in the art can make variations or modifications to these examples upon knowing the basic inventive concept. The appended claims is intended to be considered as comprising the preferred examples and all the variations or modifications fell into the scope of the present invention.

Obviously, those skilled in the art can make variations or modifications to the present invention without departing the spirit and scope of the present invention. As such, if these variations or modifications belong to the scope of the claims and equivalent technique, they may also fall into the scope of the present invention.

What is claimed is:

1. An apparatus for face verification, comprising:
at least one processor and a memory having processor-executable instructions stored therein, and the instructions when executed by the at least one processor, configure the apparatus to:
extract DeepID2 from different regions of face images by using differently trained convolutional feature extraction systems, wherein each of the systems comprises:
a layer cascade comprising a plurality of convolutional layers, a plurality of pooling layers, a plurality of locally-connected layers and a plurality of fully-connected layers, wherein an output layer of the layer cascade is connected to at least one of a previous convolutional, the pooling, the locally-connected, or the fully connected layers, and is configured to extract facial features as the DeepID2 for face verification from the facial features in the connected layers, wherein the fully-connected layers are directly connected to the locally-connected layers and the pooling layers, and are configured to receive an output of the locally-connected layers as a first input and receive an output of the pooling layers as a second input; and
compare the facial features extracted by said output layer from two face images to be compared to determine if the two face images are from a same identity or not.

2. The apparatus of claim 1, wherein the output layer comprises a fully-connected layer.

3. The apparatus of claim 1, wherein the apparatus is further configured to: input pairs of face regions, an identification supervisory signal and a verification supervisory signal to the convolutional feature extraction systems to adjust weights on connections between neurons of the convolutional feature extraction systems.

4. A method for face verification, executed by a face verification processor, comprising:
extracting DeepID2 from different regions of face images by using differently trained convolutional feature extraction systems, wherein each of systems comprises a layer cascade comprising a plurality of convolutional layers, a plurality of pooling layers, a plurality of locally-connected layers, and a plurality of fully-connected layers, wherein an output layer of the layer cascade is connected to at least one of a previous convolutional, the pooling, the locally-connected, or the fully-connected layers, and is configured to extract facial features as the DeepID2 for face verification from the facial features in the connected layers, wherein the fully-connected layers are directly connected to the plurality of locally-connected layers and the plurality of pooling layers, and are configured to receive an output of the locally-connected layers as a first input and receive an output of the plurality of pooling layers as a second input and
comparing DeepID2 extracted from two face images to be compared, respectively, to determine if the two face images are from the same identity or not.

5. The apparatus of claim 1, wherein each of the convolutional layers is connected to a pooling layer, and an output of each convolution layer is inputted into the pooling layer.

6. The apparatus of claim 3, wherein the output layer is followed by an n-way softmax layer for classifying the DeepID2 extracted from each face region into one out of all classes of face identities; and wherein the apparatus is further configured to compare the classified identity and a given ground-truth identity to generate identification errors, the generated identification errors being back-propagated through the convolutional feature extraction system to adjust weights on connections between the neurons of the convolutional feature extraction system.

7. The apparatus of claim 3, wherein the apparatus is further configured to generate verification errors by comparing dissimilarities between two DeepID2 vectors extracted from two face regions, respectively; and
wherein the generated verification errors are back-propagated through the convolutional feature extraction system to adjust weights on connections between the neurons of the convolutional feature extraction system.

8. The apparatus of claim 3, wherein for each of the convolutional feature extraction systems, the processor and the each of said systems co-operate to:
1) sample two face region-label pairs from a predetermined training set;
2) extract the DeepID2 from the two face regions in the two sampled face region-label pairs, respectively;
3) generate identification errors and verification errors based on the DeepID2 extracted from the two face regions;
4) back-propagate the identification errors and the verification errors through the convolutional feature extraction system to adjust weights on connections between the neurons of the convolutional feature extraction system; and 5) repeat steps 1)-4) until the training is converged such that the weights on connections between the neurons of the convolutional feature extraction system are determined.

9. The apparatus of claim 1, wherein the apparatus is further configured to:
    select one or more groups of DeepID2 from the extracted DeepID2, each group containing the DeepID2 extracted from a plurality of face regions of each face image;
    compare the selected one or more groups of DeepID2 to output one or more face verification scores; and
    fuse the one or more face verification scores to make a single face verification decision.

10. The apparatus of claim 1, wherein each of the convolutional layers contains a plurality of neurons with local receptive fields and shared connection weights among the neurons or subsets of the neurons in the convolutional layer.

11. The apparatus of claim 7, wherein the dissimilarities between the two DeepID2 vectors comprise negative of L1 norm, L2 norm, or cosine similarity between the two DeepID2 vectors.

12. The method of claim 4, wherein the method further comprises:
    training a plurality of convolutional feature extraction systems for simultaneous identity classification and verification by inputting pairs of face regions, an identification supervisory signal and a verification supervisory signal so as to adjust weights on connections between neurons of the convolutional feature extraction systems.

13. The method of claim 12, wherein the output layer comprises a fully-connected layer.

14. The method of claim 12, wherein the training further comprises:
    classifying the DeepID2 extracted from each face region into one out of all classes of face identities;
    comparing the classified identity and a given ground-truth identity to generate identification errors; and
    back-propagating the generated identification errors through the convolutional feature extraction system to adjust weights on connections between the neurons of the convolutional feature extraction system.

15. The method of claim 12, wherein the training further comprises:
    comparing dissimilarities between two DeepID2 vectors extracted from two face regions to be compared, respectively, to generate verification errors; and
    back-propagating the generated verification errors through each convolutional feature extraction system to adjust weights on connections between the neurons of the convolutional feature extraction system.

16. The method of claim 12, wherein the training further comprises:
    classifying the DeepID2 extracted from each face region into one out of all classes of face identities;
    comparing the classified identity and a given ground-truth identity to generate identification errors;
    comparing dissimilarities between two DeepID2 vectors extracted from two face regions to be compared, respectively, to generate verification errors; and
    back-propagating a combination of the generated verification errors and the generated identification errors through each convolutional feature extraction system to adjust weights on connections between the neurons of the convolutional feature extraction system.

17. The method of claim 13, wherein the comparing further comprises:
    selecting one or more groups of DeepID2 from the extracted DeepID2, each group containing the DeepID2 extracted from a plurality of face regions of each face image;
    comparing the selected one or more groups of DeepID2 to output one or more face verification scores; and
    fusing the one or more face verification scores to make a single face verification decision.

18. The method of claim 4, wherein each of the convolutional layers contains a plurality of neurons with local receptive fields and shared connection weights among the neurons or subsets of the neurons in the convolutional layer.

19. The method of claim 12, wherein for each of the convolutional feature extraction systems, the training further comprises:
    1) sampling two face region-label pairs from a predetermined training set;
    2) extracting the DeepID2 from the two face regions in the two sampled face region-label pairs, respectively, by the convolutional feature extraction system;
    3) generating identification errors and verification errors by using the DeepID2 extracted from the two face regions;
    4) back-propagating the identification and verification errors through the convolutional feature extraction system to adjust weights on connections between the neurons of the convolutional feature extraction system; and
    5) repeating steps 1)-4) until the training is converged such that the weights on connections between the neurons of the convolutional feature extraction system are determined.

20. A method for training a convolutional feature extraction system, executed by a face verification processor, comprising:
    1) sampling two face region-label pairs from a predetermined training set;
    2) extracting DeepID2 from the two face regions in the two sampled face region-label pairs, respectively;
    3) classifying the DeepID2 extracted from each face region into one out of all classes of face identities;
    4) comparing the classified identity and a given ground-truth identity to generate identification errors;
    5) generating verification errors by minimizing dissimilarities between the DeepID2 extracted from face regions of the same identity while maximizing dissimilarities between the DeepID2 extracted from face regions of different identities;
    6) back-propagating a combination of the generated verification errors and the generated identification errors through the convolutional feature extraction system to adjust weights on connections between neurons of the convolutional feature extraction system, wherein the convolutional feature extraction system comprises a layer cascade comprising a plurality of convolutional layers, a plurality of pooling layers, a plurality of locally-connected layers and a plurality of fully-connected layers, wherein the fully-connected layers are directly connected to the locally-connected layers and the plurality of pooling layers, and are configured to receive an output of the plurality of locally-connected layers as a first input and receive an output of the plurality of pooling layers as a second input; and 7) repeating steps 1)-6) until the training is converged such that the weights on connections between the neurons of the convolutional feature extraction system are determined.

* * * * *